(12) United States Patent
Yoshikawa et al.

(10) Patent No.: US 8,136,393 B2
(45) Date of Patent: Mar. 20, 2012

(54) TIRE TESTING MACHINE AND METHOD FOR TESTING TIRE

(75) Inventors: Tetsuya Yoshikawa, Takasago (JP); Yasuhiko Fujieda, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/919,027

(22) PCT Filed: Feb. 24, 2009

(86) PCT No.: PCT/JP2009/053266
§ 371 (c)(1),
(2), (4) Date: Aug. 24, 2010

(87) PCT Pub. No.: WO2009/107604
PCT Pub. Date: Sep. 3, 2009

(65) Prior Publication Data
US 2011/0000292 A1    Jan. 6, 2011

(30) Foreign Application Priority Data

Feb. 26, 2008 (JP) ................................. 2008-044183

(51) Int. Cl.
*G01M 17/02* (2006.01)
(52) U.S. Cl. ........................................................ 73/146
(58) Field of Classification Search ................... None
See application file for complete search history.

(56) References Cited

U.S. PATENT DOCUMENTS

| | | | |
|---|---|---|---|
| 3,948,080 A * | 4/1976 | Boyd | ................................. 73/9 |
| 4,479,382 A * | 10/1984 | Greenhorn et al. | ............. 73/146 |
| 4,576,040 A | 3/1986 | Cargould | |
| 5,481,907 A | 1/1996 | Chasco et al. | |
| 7,908,917 B2 * | 3/2011 | Kitagawa et al. | ............... 73/146 |
| 2009/0308156 A1 | 12/2009 | Sumimoto et al. | |
| 2010/0037686 A1 * | 2/2010 | Kitagawa et al. | ............... 73/146 |

FOREIGN PATENT DOCUMENTS

| | | |
|---|---|---|
| JP | 60 011134 | 1/1985 |
| JP | 8 507152 | 7/1996 |
| JP | 09 183544 | 7/1997 |
| JP | 2003 4598 | 1/2003 |

* cited by examiner

*Primary Examiner* — Andre Allen
(74) *Attorney, Agent, or Firm* — Oblon, Spivak, McClelland, Maier & Neustadt, L.L.P.

(57) ABSTRACT

Provided is a tire testing machine capable of measuring a force generated in a tire with high precision. The tire testing machine includes a spindle shaft (20) for holding a tire (T), a housing (22) for rotatably supporting the spindle shaft (20) through a rolling bearing (25), a running device (10) having a surface rotated by rotational driving and imparting a rotational force to a tire contacting the surface, and a measurement device (4) which is provided in the housing (22) and measures a force and moment generated in the spindle shaft (20) when the tire (T) is running. Furthermore, the tire testing machine includes a torque canceller (5) for preventing the spindle shaft (20) from such an impact that rotational friction torque (My1) generated by rotational friction, which is received by the spindle shaft (20) in the housing when the spindle shaft (20) rotates, is imparted onto the shaft (20). The torque canceller (5) is equipped with a motor (30) for the spindle shaft, which imparts a torque for cancelling the impact of the rotational friction torque (My1) to the spindle shaft (20).

8 Claims, 8 Drawing Sheets

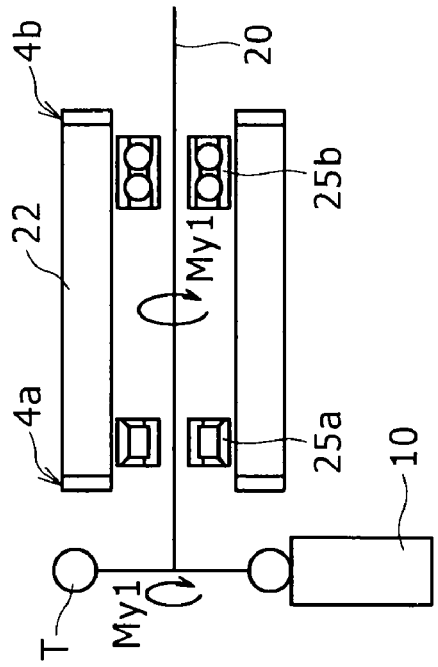
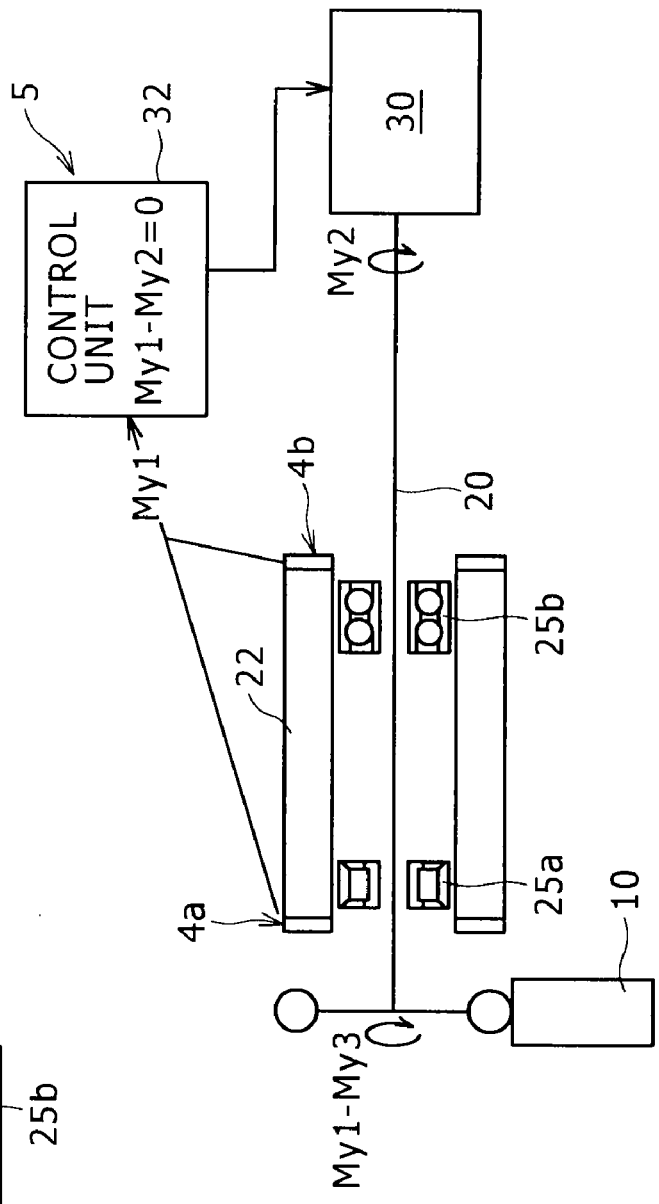

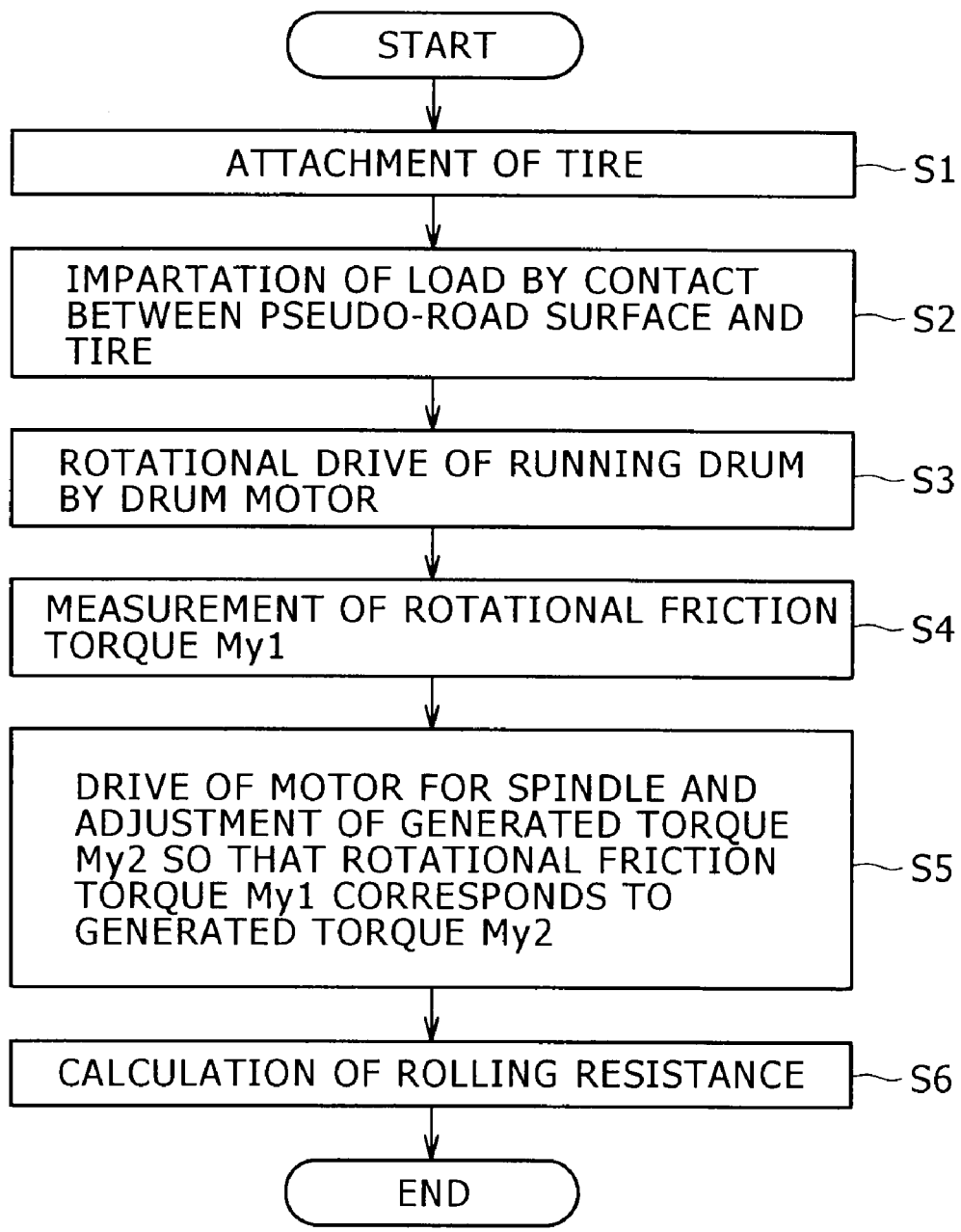

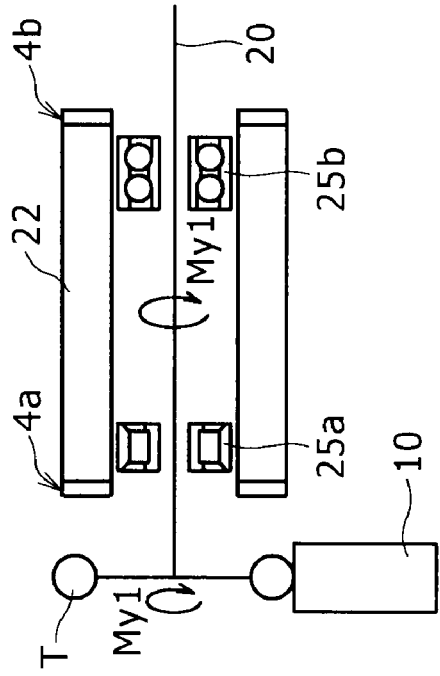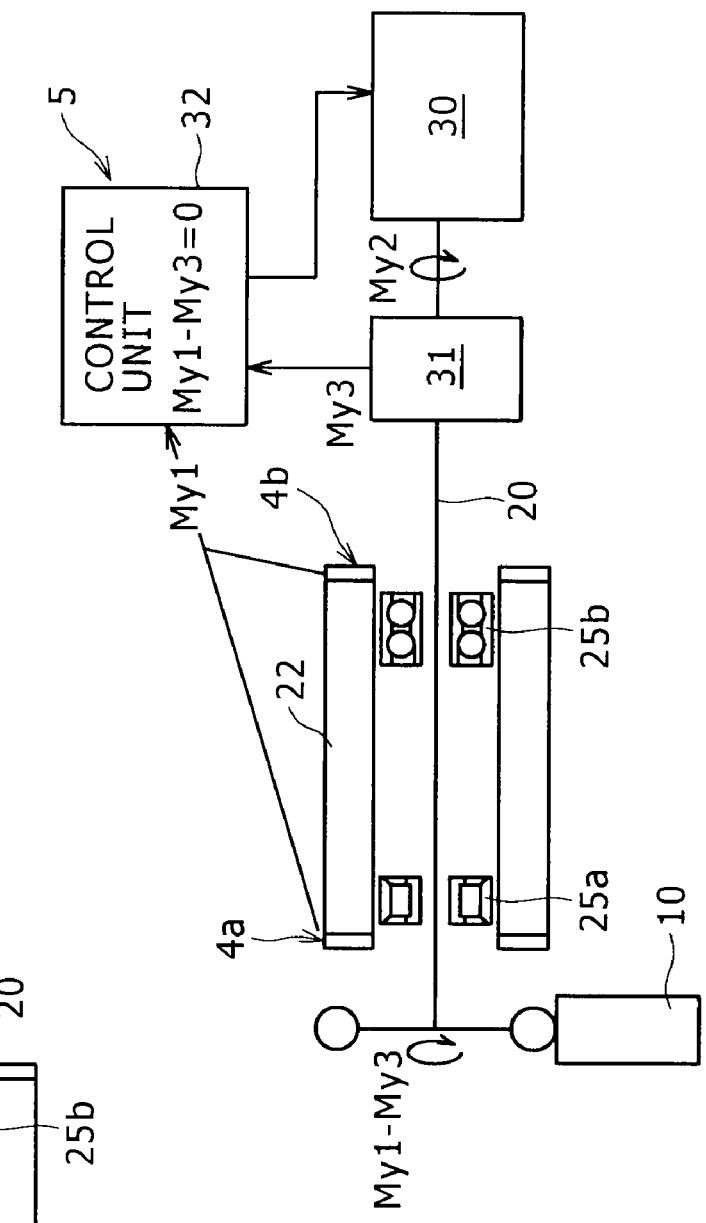

TIRE TESTING MACHINE AND METHOD FOR TESTING TIRE

TECHNICAL FIELD

The present invention relates to a tire testing machine and a method for testing the tire for measuring a force generated in a tire, which is, typically rolling resistance of the tire, for example.

BACKGROUND ART

Conventionally, there is a known tire testing machine for measuring rolling resistance of a tire, including a spindle shaft for holding a tire, a housing for rotatably supporting this spindle shaft through a bearing, a running drum for making the tire run by rotational driving, and a load cell provided in the housing for measuring a force generated in the tire. However, in such a tire testing machine, the spindle shaft is rotatably supported on the housing or the like through the bearing. Therefore, the fact is that when the spindle shaft is rotated (when the tire runs), a rotational friction torque is unavoidably generated in the spindle shaft by rotational friction of the bearing. In such a tire testing machine, the rolling resistance is measured in a state that a torque similar to the rotational friction torque is imparted onto the center of the tire through the spindle shaft. Therefore, there is a problem that a measurement value of the rolling resistance is different from the rolling resistance of the tire in the original state of freely rolling.

A trial to this problem is described in the related art document. For example, Patent Document 1 discloses a measurement method of rolling resistance of a tire for theoretically correcting a value measured by a load cell so as to eliminate an impact of a rotational friction torque by a bearing. Specifically, the method described in Patent Document 1 includes preliminarily setting a matrix (a transformation matrix) for correcting the measurement value measured by the load cell by means of calculation, and correcting the measurement value measured by the load cell based on the matrix so as to eliminate the rotational friction torque (disturbance).

However, this method is not to solve the problem that the tire is not in the original state of freely rolling. That is, even when the measurement value of the load cell is corrected so as to obtain the rolling resistance as in this method, the correction is only performed in theory, and hence the obtained value is different from actual tire rolling resistance. Furthermore, Patent Document 1 does not disclose any specific correction method. Therefore, it is highly difficult to measure the rolling resistance of the tire with high precision.

[Patent Document 1] Japanese Patent Laid-Open No. 2003-4598

DISCLOSURE OF THE INVENTION

It is an object of the present invention to provide a tire testing machine and a method for testing the tire which are capable of measuring a force generated in a tire with high precision.

In order to achieve this object, a tire testing machine according to the present invention includes a spindle shaft for holding a tire, a housing for rotatably supporting this spindle shaft through a bearing, a running device having a rotated running surface, the running device being adapted to give a rotational force to the tire contacting the running surface, a measurement device provided in the housing for measuring a force and moment generated in the spindle shaft, and a torque canceller for canceling an impact of a rotational friction torque received by the spindle shaft from the housing in accordance with rotation of the spindle shaft on the measurement. This torque canceller is provided separately from the running device, including a spindle shaft torque imparter for imparting a torque for cancelling the impact of the rotational friction torque to the spindle shaft.

A method for testing a tire according to the present invention is to measure a force generated in the tire with a tire testing machine including a spindle shaft for holding the tire, a housing for rotatably supporting this spindle shaft through a bearing, a running device having a surface rotated by rotational driving, the running device being adapted to give a rotational force to the tire abutting this surface, and a measurement device provided in the housing for measuring a force and moment generated in the spindle shaft, the method including measuring the force generated in the tire while imparting a torque onto the spindle shaft separately from the running device so as to cancel an impact of a rotational friction torque received by the spindle shaft in the housing in accordance with rotation of the spindle shaft.

BRIEF DESCRIPTION OF THE DRAWINGS

FIG. 4 FIG. 4(a): a view showing a rotational friction torque applied onto a spindle shaft according to the first embodiment when the spindle shaft is rotated; and FIG. 4(b): a view showing a relationship between the rotational friction torque and a generated torque and a detected torque.

FIG. 5 A flowchart for illustrating a method for testing a tire according to the first embodiment.

FIG. 7 FIG. 7(a): a view showing the rotational friction torque applied onto the spindle shaft according to the second embodiment when the spindle shaft is rotated; and FIG. 7(b): a view showing a relationship between the rotational friction torque and a generated torque and a detected torque.

BEST MODES FOR CARRYING OUT THE INVENTION

Hereinafter, embodiments of the present invention will be described with reference to the drawings.

First Embodiment

Figure 1:
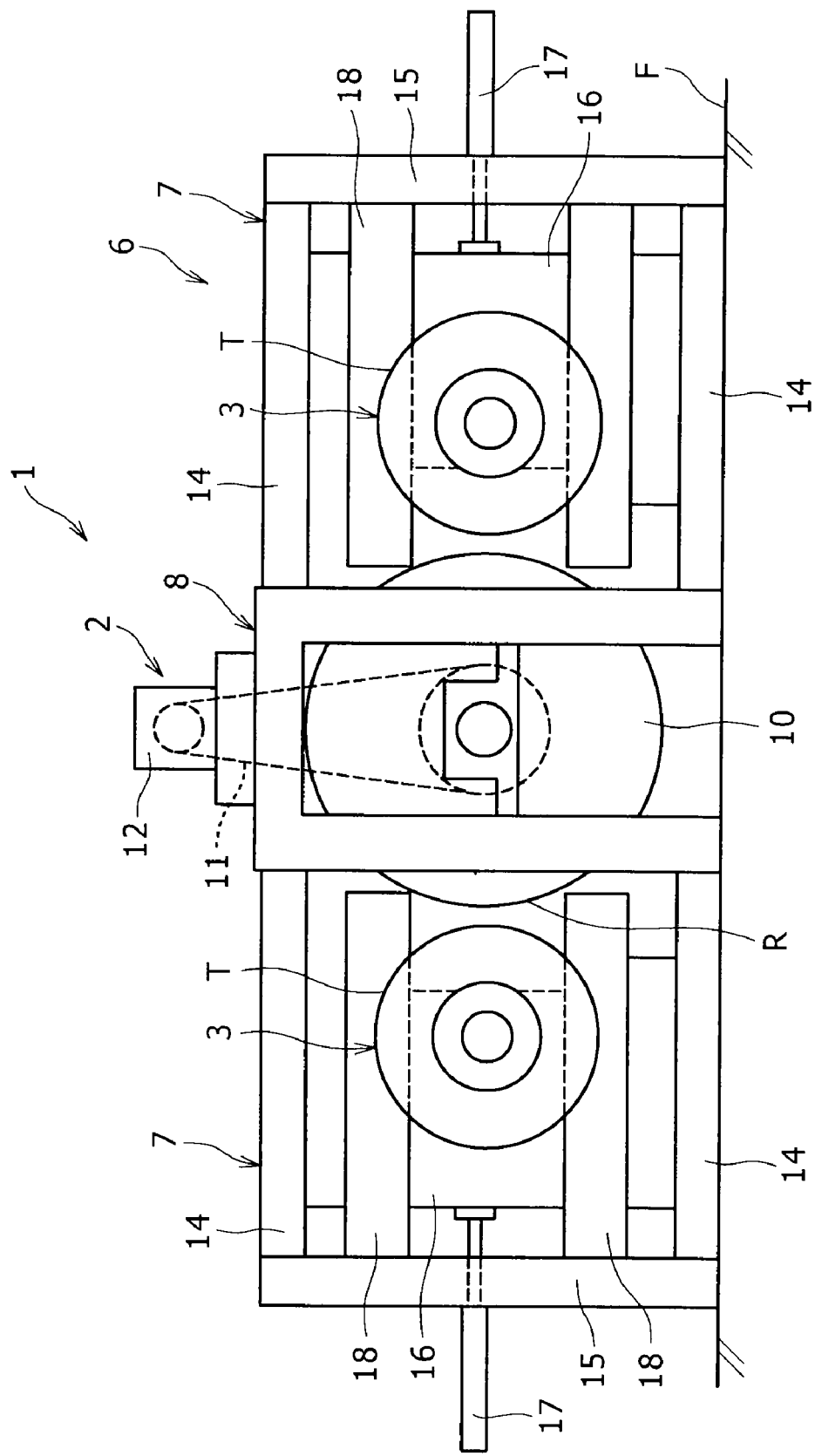
FIG. 1 An entire front view of a tire testing machine according to a first embodiment.
Figure 2:
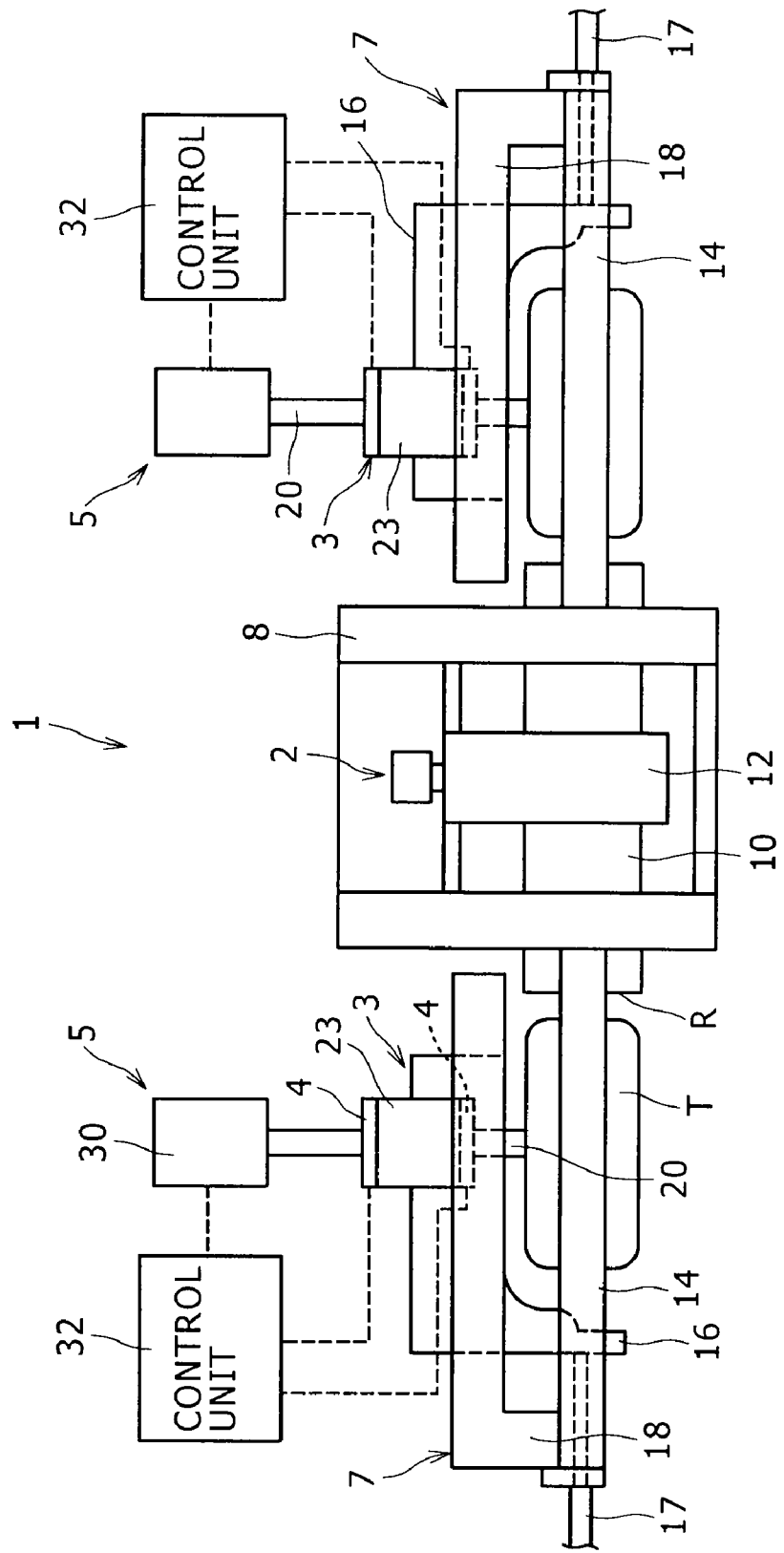
FIG. 2 An entire plan view of the tire testing machine according to the first embodiment.

FIG. 1 is an entire front view of a tire testing machine 1 according to a first embodiment of the present invention. FIG. 2 is a plan view of the tire testing machine 1. In the following description, the up and down direction in FIG. 1 indicates the up and down direction, and the left and right direction in FIG. 1 indicates the left and right direction, and the through direction in FIG. 1 indicates the front and rear direction. The up and down direction in FIG. 2 indicates the front and rear direction, and the left and right direction in FIG. 2 indicates the left and right direction, and the through direction in FIG. 2 indicates the up and down direction.

As shown in FIGS. 1 and 2, the tire testing machine 1 is a device for measuring, for example, rolling resistance of tires T, and is provided with a running device 2 for making the tires T run, tire holding devices 3 for rotatably supporting the tires T, measurement devices 4 (FIG. 2), and torque cancellers 5. The tire testing machine 1 according to this embodiment is provided with one running device 2, and two tire holding devices 3, 3.

The running device 2 is provided in a center part of a main frame 6 provided on an installment surface F, and the tire holding devices 3, 3 are provided on the left and right sides of the main frame 6 respectively so as to be positioned on both the left and right sides of the running device 2 respectively. In detail, the main frame 6 is divided into a center frame 8 and left and right frames 7, 7 positioned on the left and right sides of the center frame. The running device 2 is supported on the center frame 8, and the tire holding devices 3, 3 are supported on the left and right frames 7, 7 respectively.

The running device 2 has a cylindrical pseudo-road surface R (a tire contact surface). A rolling force (a rotational force) is imparted onto the tires T by rotationally moving the pseudo-road surface R in a state that the tires T contact this pseudo-road surface R. That is, the tires T onto which the rolling force (the rotational force) is imparted run (rotate) on the pseudo-road surface R. This running device 2 can also impart the rolling force (the rotational force) onto the tires T so that the tires T (freely) rotate after being brought apart from the pseudo-road surface R.

The running device 2 according to the present embodiment is provided with a running drum 10 supported on the center frame 8 so as to be rotatable around a horizontal shaft in the front and rear direction, and a drum motor 12 (a drive source) provided on an upper part of the center frame 8 for transmitting mechanical power to the running drum 10 through a belt member 11. An outer peripheral surface of the running drum 10 serves as the pseudo-road surface R. The drum motor 12 rotates the running drum 10 so as to rotate the pseudo-road surface R.

The tire holding devices 3 hold the tires T rotatably around horizontal shafts in the front and rear direction, and are movably provided in the left and right frames 7, 7 respectively. In detail, as shown in FIG. 3, each of the tire holding devices 3 is provided with a rim 28 to which the tire T is installed, a spindle shaft (the horizontal shaft) 20 to be rotated integrally with this rim 28, a tubular housing 22 for rotatably supporting this spindle shaft 20, and a tubular housing holding member 23 for holding this housing 22.

As shown in FIGS. 1 and 2, each of the left and right frame 7, 7 for supporting the tire holding devices 3 is provided with a pair of upper and lower first lateral members 14, two upper and lower second lateral members 18 provided between the upper and lower first lateral members 14 on the left or right side, a left or right vertical member 15 for coupling left outer ends or right outer ends of the first lateral members 14 and the second lateral members 18 in the up and down direction, and a left or right slide member 16 provided between the second lateral members 18 which are adjacent to each other in the up and down direction, the slide member being movable in the left and right direction relative to the second lateral members 18. The tire holding devices 3 are attached to the slide members 16 respectively. A pair of left and right actuators 17 for sliding the slide members 16 are fixed to the vertical members 15 and coupled to the slide members 16, respectively. The actuators 17 are extendable and contractible in the left and right direction, and the extension and contraction thereof moves the slide members 16 and the tire holding devices 3 supported on the slide members in the left and right direction relative to the second lateral members 18.

Figure 3:
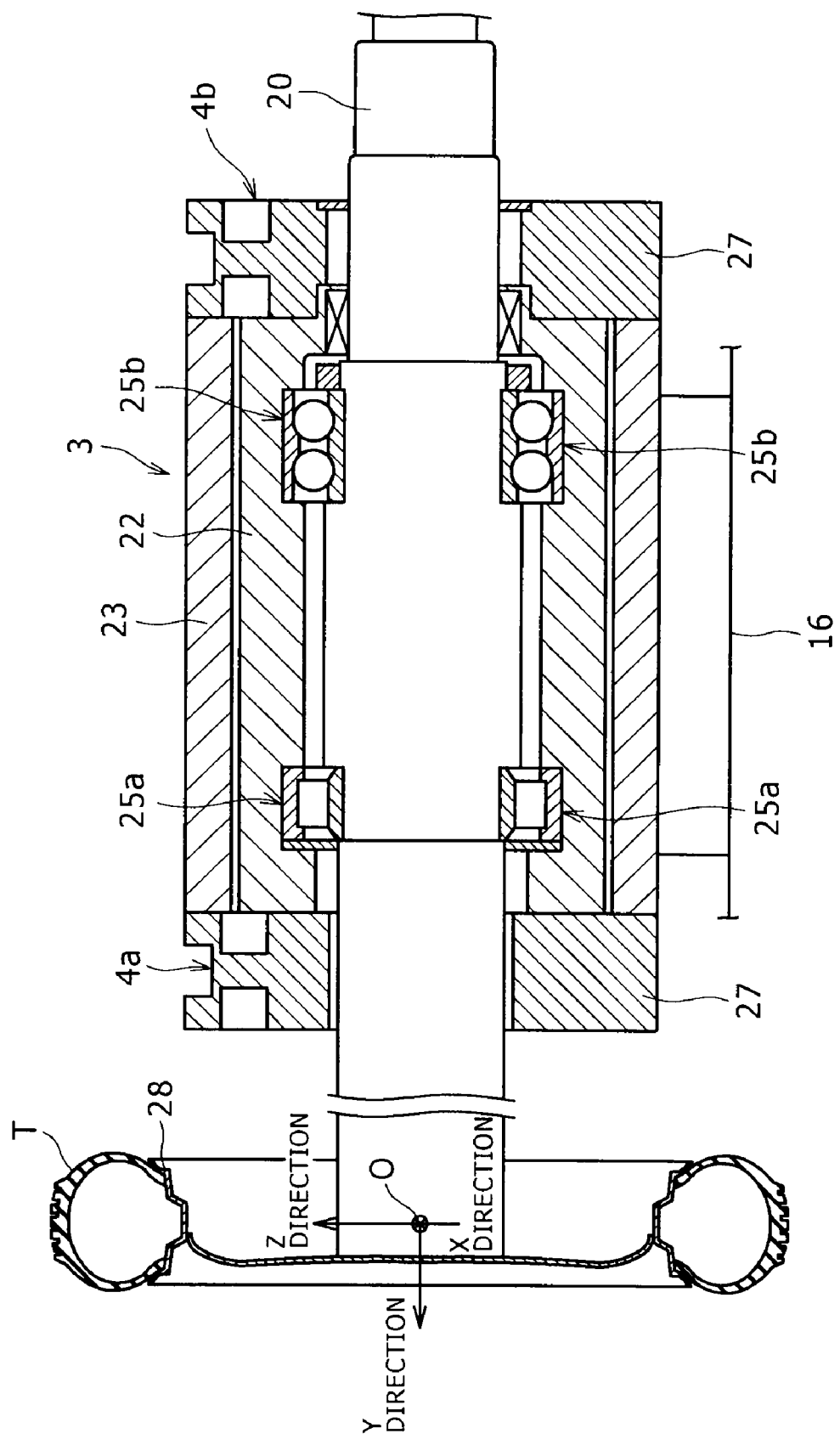
FIG. 3 A sectional view of a tire holding device according to the first embodiment.

The housing holding member 23 shown in FIGS. 2 and 3 is fixed to the slide member 16 for holding the tubular housing 22. In the present embodiment, an axis of the housing 22 and an axis of the housing holding member 23 correspond to each other, and the housing 22 and the housing holding member 23 have substantially similar axial length.

As shown in FIG. 3, the spindle shaft 20 is inserted into the housing 22, and bearings (rolling bearings) 25a, 25b for rotatably supporting the spindle shaft 20 are provided between an outer peripheral surface of the spindle shaft 20 and an inner peripheral surface of the housing 22 so as to be spaced from each other in the front and rear direction. Among the bearings 25a, 25b, the bearing 25a provided on the front end side of the spindle shaft 20 (the side in which the tire T is attached) is a roller bearing, and the bearing 25b provided on the base end side of the spindle shaft 20 is a ball bearing. Inner races of these bearings 25a, 25b are fixed to the spindle shaft 20, and outer races are fixed to the housing 22.

The measurement device 4 has two load cells 4a, 4b (six-component gauges) capable of measuring a force and moment acting between the housing 22 and the housing holding member 23. The load cell 4a (the six-component gauge) is attached to a side surface of the housing 22 on the side in which the tire is attached, and the other load cell 4b (the six-component gauge) is attached to a side surface of the housing 22 on the opposite side to the side on which the tire is attached. These two load cells 4a, 4b sandwich the rolling bearings 25 for rotatably holding the spindle shaft 20 as described above from both the front and rear sides. With this structure, the measurement device 4 can measure the force and the moment generated in the spindle shaft.

Each of the load cells 4a, 4b has a plurality of disc plate members 27 and a plurality of strain gauges (not shown). The plate members 27 are attached to longitudinal side surfaces of the housing 22 and the housing holding member 23 respectively, and processed so that strain is locally concentrated in the plate members due to the force acting between the housing 22 and the housing holding member 23. The strain gauges are adhered to surfaces of parts, respectively, of the plate members 27 where the strain is concentrated as described above, and electrically connected to a strain indicator (not shown). This strain indicator calculates a load (the force) and the moment in the X, Y, Z directions acting between the housing 22 and the housing holding member 23, according to a method known to those skilled in the art, based on output signals from the strain gauges. The X, Y, Z directions correspond to the directions of three-dimensional coordinate axes relative to the rotation center O of the tire T respectively. In FIG. 3, the through direction indicates the X direction (the left and right direction in FIGS. 1, 2), the left and right direction indicates the Y direction (the front and rear direction in FIGS. 1, 2), and the up and down direction indicates the Z direction (the up and down direction in FIGS. 1, 2).

With the tire holding device 3 and the measurement device 4, the force acting on the spindle shaft 20 is transmitted to the housing 22, and further transmitted to the plate members 27 sandwiched between this housing 22 and the housing holding member 23 fixed to the slide member 16. In such a way, the force generated in the tire is transmitted to the spindle shaft 20, the bearings 25, the housing 22, and then the strain concentrated parts of the load cells 4a, 4b, and taken out as the signals of the strain gauges to be measured.

As shown in FIG. 4(a), in a state that the tire T contacts the pseudo-road surface R of the running drum 10 of the running device 2 and is rotated by the rotational force of the running drum 10, the spindle shaft 20 is also rotated (following the rotation of the tire T). At this time, due to an impact of the bearings 25, a shaft sealing member, lubricant oil and the like placed between the spindle shaft 20 and the housing 22 (an impact of rotational friction in the housing), the moment around the Y axis is generated in the spindle shaft 22. This moment is measured as moment My around the Y axis of the coordinate axes (hereinafter, sometimes referred to as the rotational friction torque My1) in the measurement device 4 through the housing 22.

A tire test in which a characteristic such as the rolling resistance of the tire is measured is based on the premise that a rotational torque is not imparted onto the center of the tire, that is, the tire is in a so-called state of freely rolling as described above. Meanwhile, the state that the rotational friction torque My1 generated at the time of rotating the spindle shaft 20 is imparted onto the spindle shaft 20 due to the impact of the bearings 25, the shaft sealing member, the lubricant oil and the like as described above is not the original state of freely rolling. That is, the rotational friction torque My1 received from the housing 22 in accordance with the rotation of the spindle shaft 20 becomes a cause of generating a measurement error.

In the present invention, as shown in FIGS. 2 and 4(b), a torque canceller 5 for canceling the impact of the rotational friction torque My1 which the spindle shaft 20 receives from the housing 22 and the like as the spindle shaft rotates is further provided. Torque canceller 5 is provided with a rotational friction torque measuring unit for measuring the moment around the Y axis corresponding to the rotational friction torque My1, a motor 30 for the spindle shaft, and a control unit 32. In this embodiment, the measurement device 4 also serves as the rotational friction torque measuring unit.

The motor 30 for the spindle shaft is formed by a synchronous motor and imparts a predetermined torque My2 onto the spindle shaft 20 at the time of the tire test. In detail, the motor 30 for the spindle shaft is coupled to a base end of the spindle shaft 20 for applying the torque counteracting the rotational friction torque My1 due to rotational resistance and the like of the rolling bearings 25a, 25b onto the spindle shaft 20. In other words, the motor 30 for the spindle shaft imparts the torque My2 with the same magnitude as and in the opposite direction to the rotational friction torque My1 (the torque for cancelling the impact of the rotational friction torque My1 in the housing 22) onto the spindle shaft 20.

The measurement device 4 measures the force and the moment acting between the housing 22 and the housing holding member 23 at the time of the tire test, and outputs measurement values thereof to the control unit 32. The moment around the Y axis corresponding to the rotational friction torque My1 is outputted to the control unit 32 together with other measurement results.

The control unit 32 controls the generated torque (the output torque) My2 outputted from the motor 30 for the spindle shaft. For example, the control unit 32 controls the generated torque My2 of the motor 30 for the spindle shaft based on the rotational friction torque My1 which is the moment around the Y axis among the values measured by the measurement device 4. In detail, the control unit 32 adjusts the generated torque My2 of the motor 30 for the spindle shaft so that the rotational friction torque My1 measured during the tire test corresponds to the generated torque My2 (that is, "My1−My2=0"). This adjustment is performed with, for example, inverter control (such as VVVF control) of changing voltage, frequency and the like of the motor 30 for the spindle shaft.

Next, a method for testing the tire according to the present invention will be described with operations of the tire testing machine. Measurement of the rolling resistance of the tire will be taken as an example and described with reference to a flowchart in FIG. 5.

Firstly, the tire T whose rolling resistance is measured is attached to the rim 28 of the tire holding device 3 shown in FIG. 3 (Step S1 of FIG. 5). In a state that the tire T is attached in such a way, the actuator 17 is operated so as to move the tire holding device 3 in the direction in which the device 3 is brought close to the running drum 10. Since the tire T is pushed toward the pseudo-road surface R of this running drum 10, a predetermined load is imparted onto the tire T (Step S2). The drum motor 12 is operated while the load is imparted in such a way, so that the running drum 10 is rotated by predetermined rotation speed (Step S3).

Next, in a state that the tire T is driven to rotate by the mechanical power of the drum motor 12, that is, the rotational force of the running drum 10, the measurement device 4 measures the rotational friction torque My1 imparted onto the spindle shaft 20 (Step S4). In this state, the rotational friction torque My1 is imparted onto the center of the tire T. Then, the motor 30 for the spindle shaft is operated and the control unit 32 controls the generated torque My2 of the motor 30 for the spindle shaft so that the rotational friction torque My1 measured by the measurement device 4 corresponds to the generated torque My2 (that is, "My1−My2=0") (Step S5).

At the time of running the tire T driven by the motor 30 for the spindle shaft and the drum motor 12, the measurement device 4 (the multi-component gauge) can determine a vertical load (a load reaction force) Fz in a state that the tire T contacts the pseudo-road surface R and a force Fx acting in the tire forward direction. By using these measurement values, a rolling radius in a state that the tire T runs and the like, the rolling resistance of the tire T can be determined (S6). Methods for determining the rolling resistance of this tire T is the same as the conventional art and not particularly limited. For example, the methods may include a method inputting various data such as the load (the force) in the X, Y, Z directions and the moment measured by the load cells and the rolling radius into a calculation device such as the control unit 32 and a computer (not shown) and determining the rolling resistance of the tire T by the calculation device from the various data, and other methods.

In the tire testing machine 1, at the time of performing the tire test (for example at the time of performing a test of measuring the rolling resistance of the tire T), the torque is imparted onto the spindle shaft 20 while adjusting the generated torque My2 of the motor 30 for the spindle shaft so that the rotational friction torque My1 corresponds to the generated torque My2 (so that a difference between the torques becomes zero). Therefore, the impact of the rotational friction torque My1 generated due to the rotational resistance and the like of the rolling bearings 25a, 25b at the time of running the tire on the measurement values is cancelled by the generated torque My2. In other words, since the motor 30 for the spindle shaft imparts the torque with the magnitude and the direction for cancelling the impact of the rotational friction torque My1 onto the spindle shaft 20, the rotational friction torque My1 can be compensated and the spindle shaft 20 can be rotated in the state of freely rolling with no impact of the rotational friction torque My1 (in a state that the rotational friction torque My1 is not imparted onto the center of the tire T).

As described above, the moment around the Y axis due to the fact that the spindle shaft 20 receives the impact from the bearings 25a, 25b, the shaft sealing member, the lubricant oil and the like, that is, the moment received in the housing in accordance with the rotation of the spindle shaft is eliminated. That is, the impact of the rotational friction torque My1 is cancelled, and torsion of the spindle shaft 20 due to the rotational friction torque My1 is eliminated. This enables precise measurement of the rolling resistance of the tire T. Moreover, since the measurement device 4 for measuring the force generated in the tire T also serves as the rotational friction torque measuring unit for measuring the rotational friction torque My1, the impact of the rotational friction torque My1 can be cancelled by a highly simple structure and control.

Second Embodiment

Figure 6:
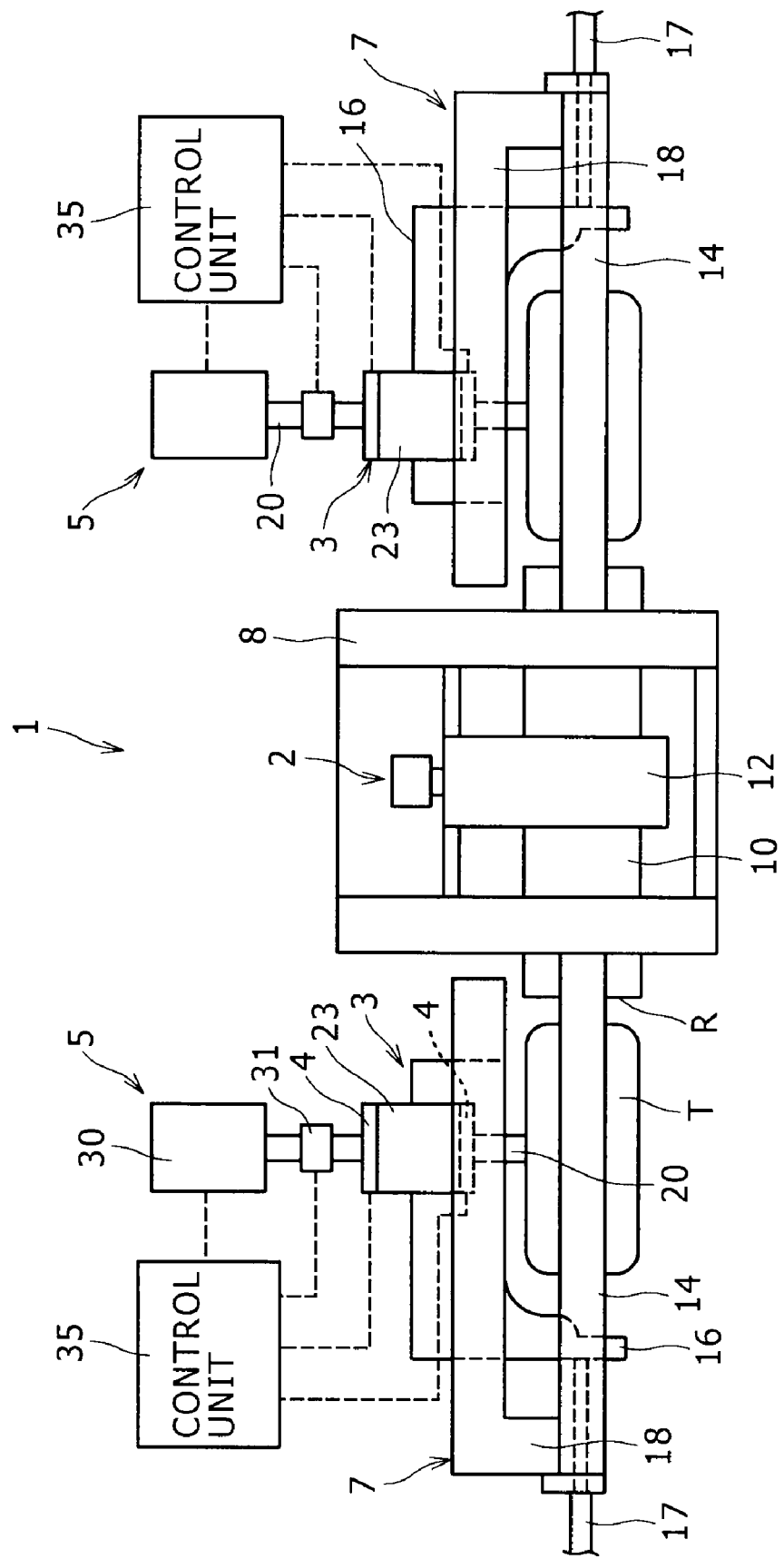
FIG. 6 An entire plan view of the tire testing machine according to a second embodiment.

FIGS. 6 and 7 show a modified example of the torque canceller 5 of the tire testing machine 1 as a second embodiment of the present invention. FIG. 7(a) shows the rotational friction torque applied onto the spindle shaft, and FIG. 7(b) shows a relationship between the rotational friction torque and the generated torque and detected torque.

Also in the second embodiment, the measurement device 4 serves also as the rotational friction torque measuring unit. The torque canceller 5 is provided with the rotational friction torque measuring unit, the motor 30 for the spindle shaft, a spindle shaft torque detecting unit 31, and a control unit 35. Since the measurement device 4 and the motor 30 for the spindle shaft are the same as the first embodiment, description thereof will be omitted.

The spindle shaft torque detecting unit (a torque detection meter) 31 is arranged on the spindle shaft 20 (on the spindle shaft 20 between the housing 22 and the motor 30 for the spindle shaft) for detecting a torque My3 applied onto this spindle shaft 20 and outputting the torque to the control unit 32. For convenience of the description, the torque of the spindle shaft 20 detected by the spindle shaft torque detecting unit 31 is sometimes called as the detected torque My3. This spindle shaft torque detecting unit 31 may be built in the motor 30 for the spindle shaft.

The control unit 35 controls the generated torque My2 of the motor 30 for the spindle shaft based on the rotational friction torque My1 measured by the measurement device 4 and the torque My3 detected by the spindle shaft torque detecting unit 31 at the time of rotating the tire T by the rotational force given from the running device 2. In detail, the control unit 35 adjusts the generated torque My2 of the motor 30 for the spindle shaft so that the rotational friction torque My1 corresponds to the detected torque My3 at the time of performing the tire test ("My1−My3=0"). This adjustment is performed with, for example, the inverter control (such as the VVVF control) of changing the voltage, the frequency and the like of the motor 30 for the spindle shaft.

Figure 8:
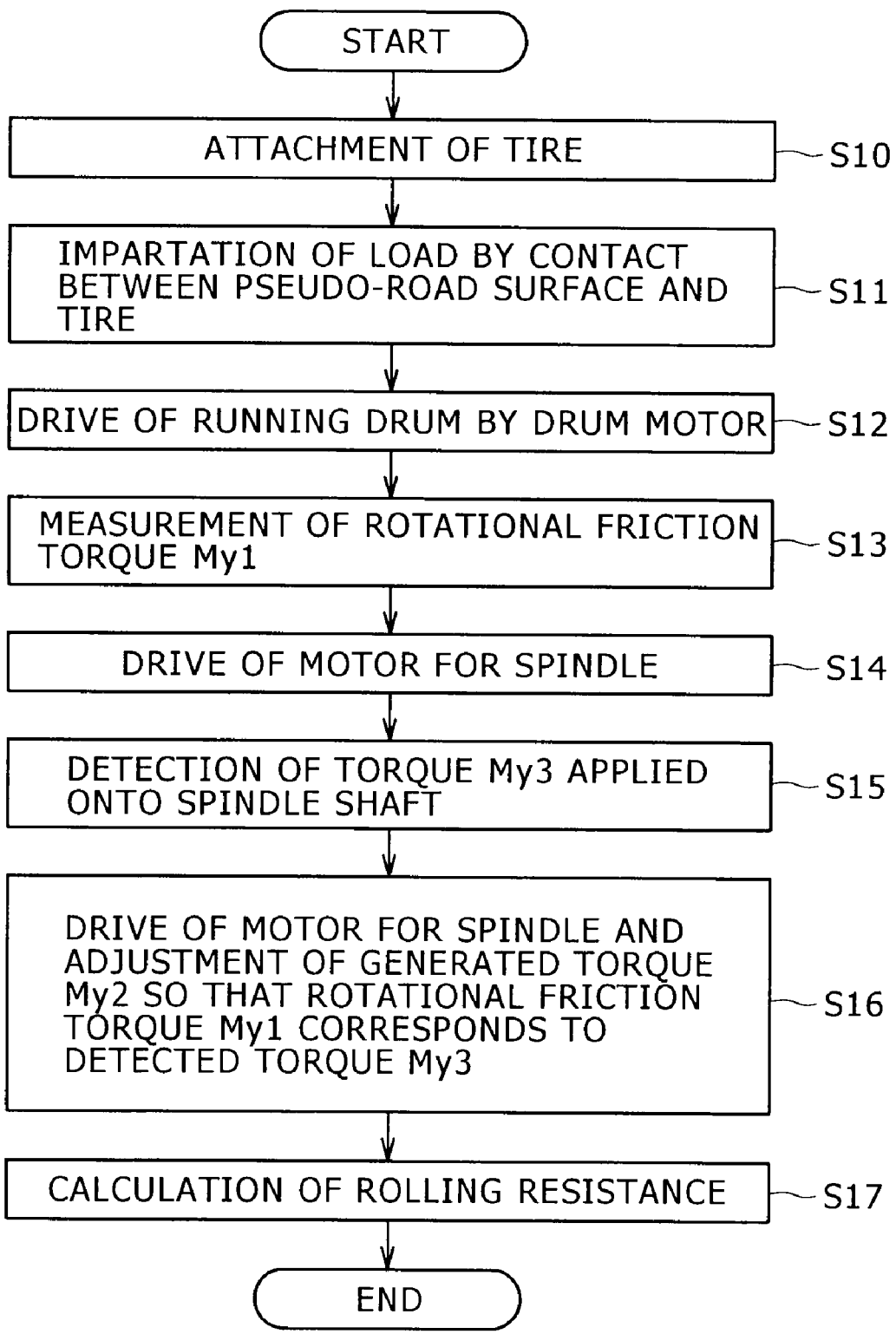
FIG. 8 A flowchart for illustrating a method for testing a tire according to the second embodiment.

FIG. 8 shows a method for testing the tire in the second embodiment. Steps S10 to S13 and S17 shown in FIG. 8 are the same as Steps S1 to 4 and S6 of FIG. 5, respectively, according to the method for testing a tire of the first embodiment. Therefore, description thereof will be omitted.

In Step S14 of FIG. 8, the motor 30 for the spindle shaft is driven to rotate while generating the torque My2. Thereby, the torque received by a shaft end of the spindle shaft 20 is measured by the spindle shaft torque detecting unit 31 as the detected torque My3 (Step S15). The control unit 32 controls the generated torque My2 of the motor 30 for the spindle shaft so that this detected torque My3 corresponds to the rotational friction torque My1 ("My 1−My3=0") (Step S16).

That is, according to this tire testing machine 1, at the time of performing the tire test, the torque is imparted onto the spindle shaft 20 while adjusting the generated torque My2 of the motor 30 for the spindle shaft so that the rotational friction torque My1 corresponds to the detected torque My3. Thereby, the impact of the rotational friction torque My1 is cancelled.

The torque canceller 5 is provided with the spindle shaft torque detecting unit 31 for detecting the torque applied onto the spindle shaft 20, and the control unit 32 for controlling the motor 30 for the spindle shaft based on the torque My3 detected by this spindle shaft torque detecting unit 31 and the rotational friction torque My1 received by the spindle shaft 20 which is measured by the measurement device 4. Therefore, the torque applied onto the spindle shaft 20 during the test of the tire T can be adjusted by feedback control, so that precision of the generated torque My2 for cancelling the rotational friction torque My1 can be improved.

The present invention is not limited to the above embodiments as described below, for example.

The rolling resistance is measured as the force generated in the tire in the above embodiments. However, an object to be measured is not limited. The tire testing machine and the method for testing the tire according to the present invention can be applied to an object with measurement precision improved by eliminating the impact of the rotational friction torque received by the spindle shaft 20. In the above embodiments, the force generated in the tire T is measured when the tire T is rotated by the rotational force given from the running device. However, the force generated in the tire T may be measured in a state that the running device is brought apart from the tire T after contacting the tire T and giving the rotational force to the tire T, that is, in the state of freely rolling of the tire T.

Various known methods may be applied to specific means (measurement devices) and methods for measuring the force generated in the tire. The methods are not particularly limited as long as the methods are capable of measuring the rotational friction torque received by the spindle shaft.

In the above embodiments, the moment around the Y axis generated in the spindle shaft 22 due to the impact of the bearings 25a, 25b, the shaft sealing member, the lubricant oil and the like is measured as the rotational friction torque My1. However, since the impact of the moment due to rotational friction resistance of the bearings 25a, 25b is the largest, the rotational friction torque My1 may be regarded as the rotational friction resistance of the bearings. For example, the rotational friction torque My1 of the spindle shaft 22 generated by the rotational friction resistance of the bearings 25a, 25b may be preliminarily determined by experiments, and this motor 30 for the spindle shaft may give the torque counteracting the rotational friction torque My1 to the spindle shaft 22. Alternatively, separately from the measurement device 4, an exclusive torque meter for measuring the rotational friction torque My1 may be installed.

As described above, the present invention is to provide the tire testing machine capable of measuring the force generated in the tire with high precision and the method for testing the tire. Specifically, the tire testing machine according to the present invention includes the spindle shaft for holding the tire, the housing for rotatably supporting the spindle shaft through the bearing, the running device having the rotated running surface, the running device being adapted to give the rotational force to the tire contacting the running surface, the measurement device provided in the housing for measuring the force and the moment generated in the spindle shaft, and the torque canceller for canceling the impact of the rotational friction torque received by the spindle shaft from the housing in accordance with the rotation of the spindle shaft on the measurement. The torque canceller is, separately from the running device, provided with the spindle shaft torque imparter for imparting the torque for cancelling the impact of the rotational friction torque onto the spindle shaft. The measurement precision can be effectively improved by a simple structure in which the torque imparter imparts the torque for cancelling the impact of the rotational friction torque on the measurement to the spindle shaft separately from the running device.

Specifically, the torque canceller preferably includes the rotational friction torque measuring unit for measuring the rotational friction torque, and the control unit for controlling the generated torque of the motor for the spindle shaft based on the measured moment. For example, the control unit may control the motor for the spindle shaft so that the rotational friction torque corresponds to the generated torque of the motor for the spindle shaft. The measurement device can serve also as the rotational friction torque measurement unit, and thereby the structure of the device can be simplified.

Preferably, the torque canceller is provided with the spindle shaft torque detecting unit for detecting the torque applied onto the spindle shaft, and the control unit controls the generated torque of the motor for the spindle shaft based on the moment corresponding to the rotational friction torque measured by the measurement device and the torque detected by the spindle shaft torque detecting unit, when the tire is rotated by the rotational force given by the running device.

The control unit preferably controls the generated torque of the motor for the spindle shaft so that the difference between the moment corresponding to the rotational friction torque measured by the measurement device and the torque detected by the spindle shaft torque detecting unit becomes zero.

The present invention is to provide the method for testing the tire of measuring the force generated in the tire with the tire testing machine including the spindle shaft for holding the tire, the housing for rotatably supporting this spindle shaft through the bearing, the running device having the surface rotated by rotational driving, the running device being adapted to give the rotational force to the tire abutting the surface, and the measurement device provided in the housing for measuring the force and the moment generated in the spindle shaft. The method is characterized by measuring the force generated in the tire while imparting the torque onto the spindle shaft separately from the running device so as to cancel the impact of the rotational friction torque received by the spindle shaft in the housing in accordance with the rotation of the spindle shaft. In the tire test, preferably, when the tire is rotated by the rotational force given by the running device, the moment corresponding to the rotational friction torque is measured and the torque applied onto the spindle shaft is separately detected, and the torque to be imparted onto the spindle is controlled so that the difference between the moment corresponding to the rotational friction torque and the detected torque becomes zero.

What is claimed is:

1. A tire testing machine, comprising:
a spindle shaft for holding a tire;
a housing for rotatably supporting said spindle shaft through a bearing;
a running device having a surface rotated by rotational driving, said running device being adapted to give a rotational force to the tire abutting said surface;
a measurement device provided in said housing for measuring a force and moment generated in said spindle shaft; and
a torque canceller for canceling an impact of a rotational friction torque received by said spindle shaft in said housing in accordance with rotation of said spindle shaft, wherein said torque canceller is, separately from said running device, provided with a motor for said spindle shaft for imparting a torque for cancelling the impact of the rotational friction torque to said spindle shaft.

2. The tire testing machine according to claim 1, wherein said torque canceller is provided with a rotational friction torque measuring unit for measuring the rotational friction torque, and a control unit for controlling the generated torque of said motor for said spindle shaft based on the moment corresponding to the rotational friction torque and measured by said measurement device.

3. The tire testing machine according to claim 2, wherein said control unit controls said motor for the spindle shaft so that the moment corresponding to the rotational friction torque corresponds to the generated torque of said motor for the spindle shaft.

4. The tire testing machine according to claim 2, wherein said torque canceller is further provided with a spindle shaft torque detecting unit for detecting a torque applied onto said spindle shaft, and
said control unit controls the generated torque of said motor for said spindle shaft based on the moment corresponding to the rotational friction torque measured by said measurement device and the torque detected by said spindle shaft torque detecting unit, when the tire is rotated by the rotational force given by said running device.

5. The tire testing machine according to claim 2, wherein said measurement device serves also as said rotational friction torque measuring unit of said torque canceller.

6. The tire testing machine according to claim 5, wherein said control unit controls the generated torque of said motor for said spindle shaft so that a difference between the moment corresponding to the rotational friction torque measured by said measurement device and the torque detected by said spindle shaft torque detecting unit becomes zero.

7. A method for testing a tire of measuring a force generated in the tire with a tire testing machine comprising a spindle shaft for holding the tire, a housing for rotatably supporting the spindle shaft through a bearing, a running device having a surface rotated by rotational driving, the running device being adapted to give a rotational force to the tire abutting the surface, and a measurement device provided in the housing for measuring a force and moment generated in the spindle shaft, the method comprising:
measuring the force generated in the tire while imparting a torque onto the spindle shaft separately from the running device so as to cancel an impact of a rotational friction torque received by the spindle shaft in the housing in accordance with rotation of the spindle shaft.

8. The method for testing the tire according to claim 7, wherein
when the tire is rotated by the rotational force given by the running device, moment corresponding to the rotational friction torque is measured, and a torque applied onto the spindle shaft is separately detected, and
the torque to be imparted onto the spindle is controlled so that a difference between the moment corresponding to the rotational friction torque and the torque applied onto the spindle shaft becomes zero.

* * * * *